Dec. 31, 1940.  J. R. LEX ET AL  2,227,145
WELDING CONVEYER
Filed July 18, 1938    9 Sheets-Sheet 1

INVENTORS.
JOSEPH R. LEX.
RUDOLPH R. HEUPEL.
BY Barnes, Kisselle, Laughlin & Raisch
ATTORNEYS.

Dec. 31, 1940.   J. R. LEX ET AL   2,227,145
WELDING CONVEYER
Filed July 18, 1938   9 Sheets-Sheet 3

INVENTORS.
JOSEPH R. LEX.
RUDOLPH R. HEUPEL.
BY Barnes, Kisselle, Laughlin & Raisch
ATTORNEYS.

Dec. 31, 1940.    J. R. LEX ET AL    2,227,145
WELDING CONVEYER
Filed July 18, 1938    9 Sheets-Sheet 4
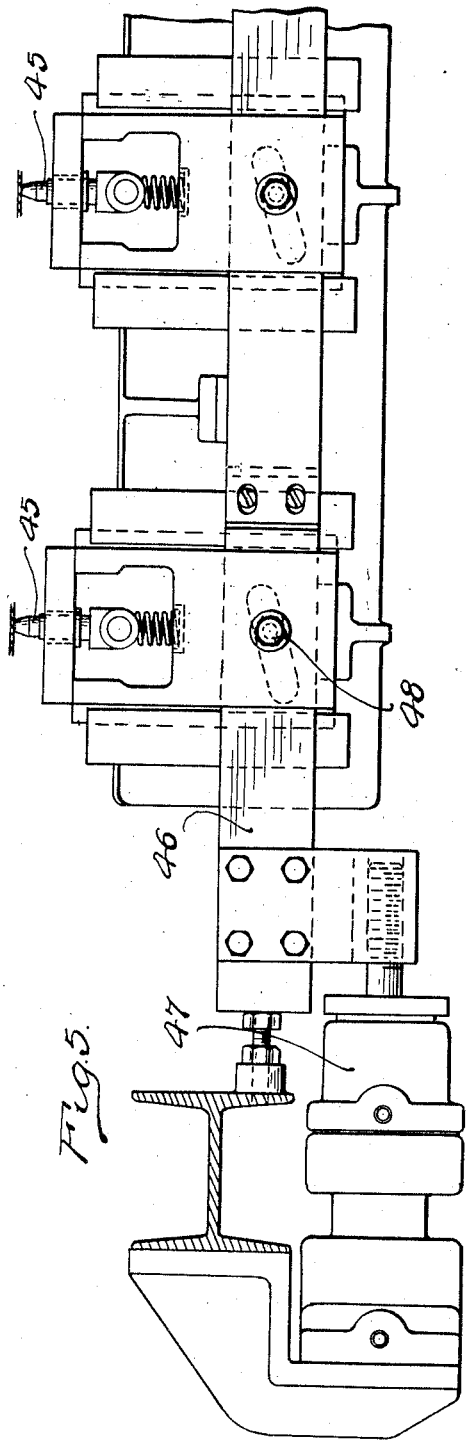
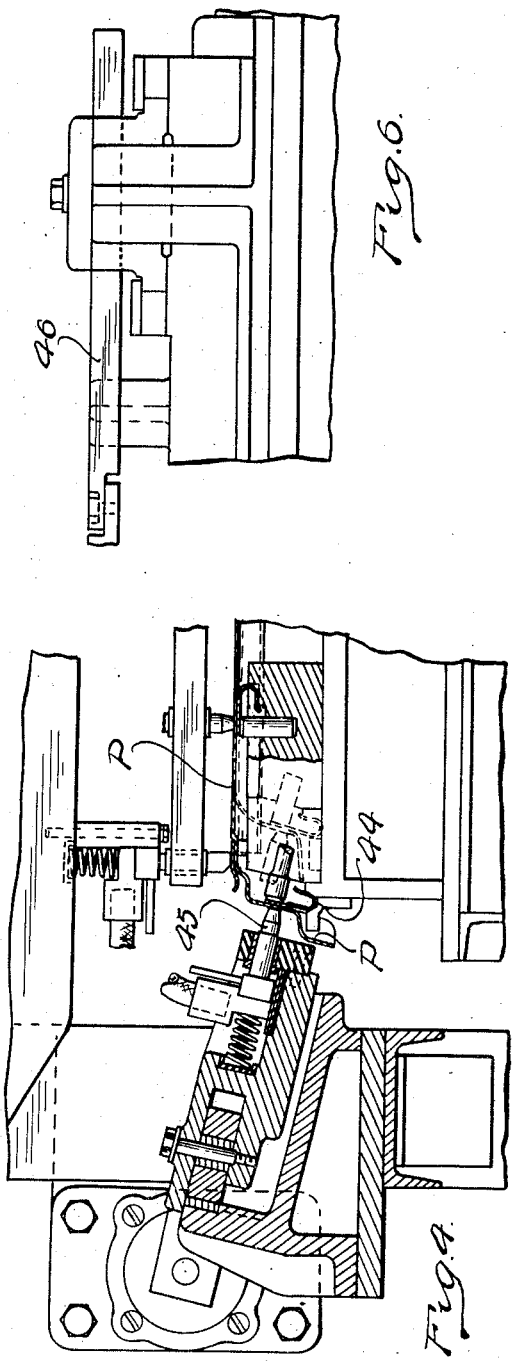
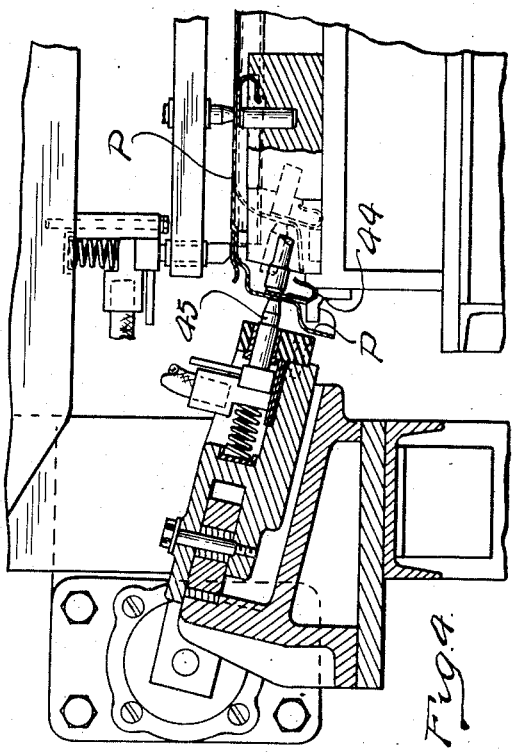
INVENTORS.
JOSEPH R. LEX
RUDOLPH R. HEUPEL.
BY Barnes, Kisselle, Laughlin & Raisch
ATTORNEYS.

Dec. 31, 1940.  J. R. LEX ET AL  2,227,145
WELDING CONVEYER
Filed July 18, 1938   9 Sheets-Sheet 5
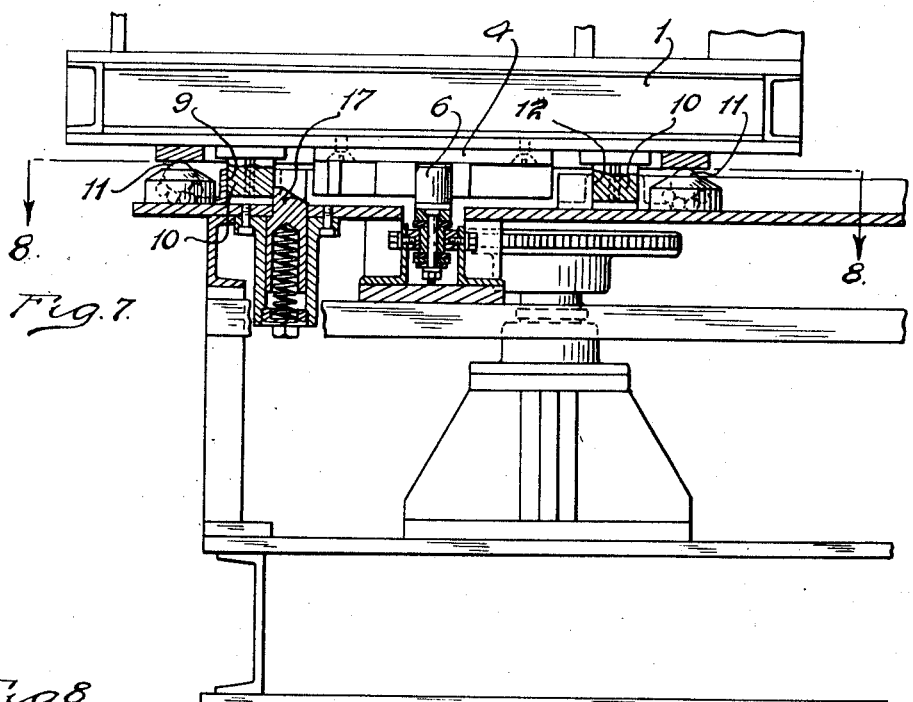
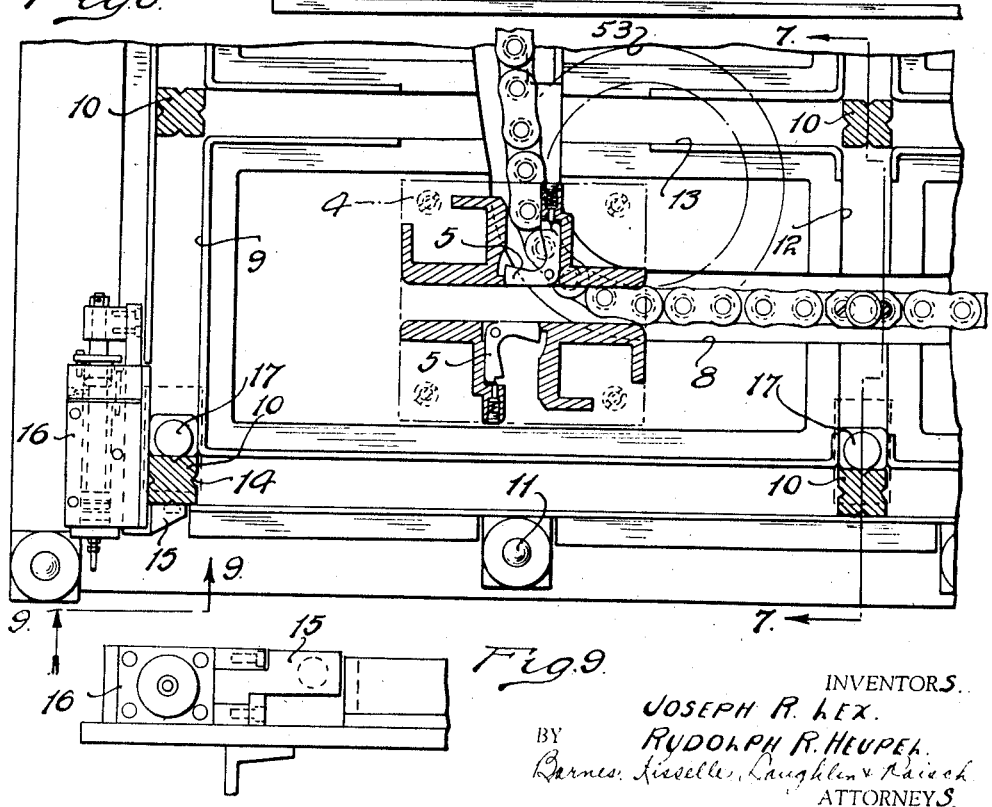
INVENTORS
JOSEPH R. LEX.
RUDOLPH R. HEUPEL.
BY Barnes, Kisselle, Laughlin & Raisch
ATTORNEYS.

Dec. 31, 1940.   J. R. LEX ET AL   2,227,145
WELDING CONVEYER
Filed July 18, 1938   9 Sheets-Sheet 6

INVENTORS.
JOSEPH R. LEX.
BY RUDOLPH R. HEUPEL.
ATTORNEYS.

INVENTORS.
JOSEPH R. LEX.
RUDOLPH R. HEUPEL
BY Barnes, Kisselle, Laughlin & Raisch
ATTORNEYS.

Dec. 31, 1940.  J. R. LEX ET AL  2,227,145
WELDING CONVEYER
Filed July 18, 1938   9 Sheets-Sheet 9
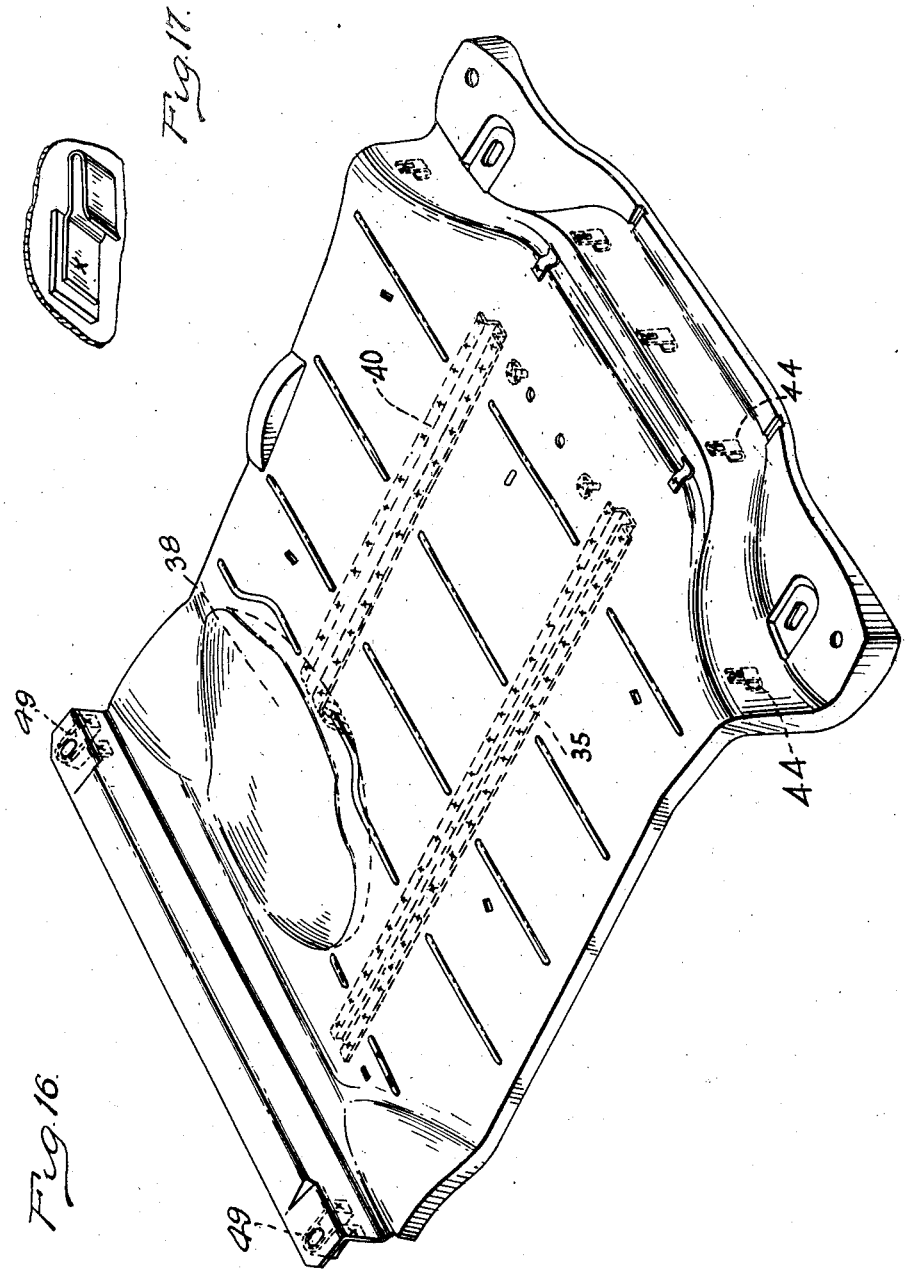
INVENTORS.
JOSEPH R. LEX.
BY RUDOLPH R. HEUPEL.
Barnes, Kisselle, Laughlin & Raisch
ATTORNEYS.

Patented Dec. 31, 1940

2,227,145

UNITED STATES PATENT OFFICE 2,227,145

WELDING CONVEYER

Joseph R. Lex and Rudolph R. Heupel, Detroit, Mich., assignors to General Motors Corporation, Detroit, Mich., a corporation of Delaware Application July 18, 1938, Serial No. 219,718

9 Claims. (Cl. 198—19)

This invention relates to a shuffle or intermittent work conveyer and gang spot welder.

In the drawings:

Fig. 4 is a cross section through one of the side welding elements.

Fig. 5 is a plan view of the same.

Fig. 6 is a fragmentary view of the same.

Fig. 7 is a cross section through the conveyer.

Fig. 8 is a plan view of one corner of the conveyer with the underside of the work carrier in horizontal cross section taken on line 8—8 of Fig. 7.

Fig. 9 is a fragmentary elevational view of the bumper arrangement.

Fig. 16 is a perspective of the work.

Fig. 17 is a perspective view of an attached clip.

Figure 1:
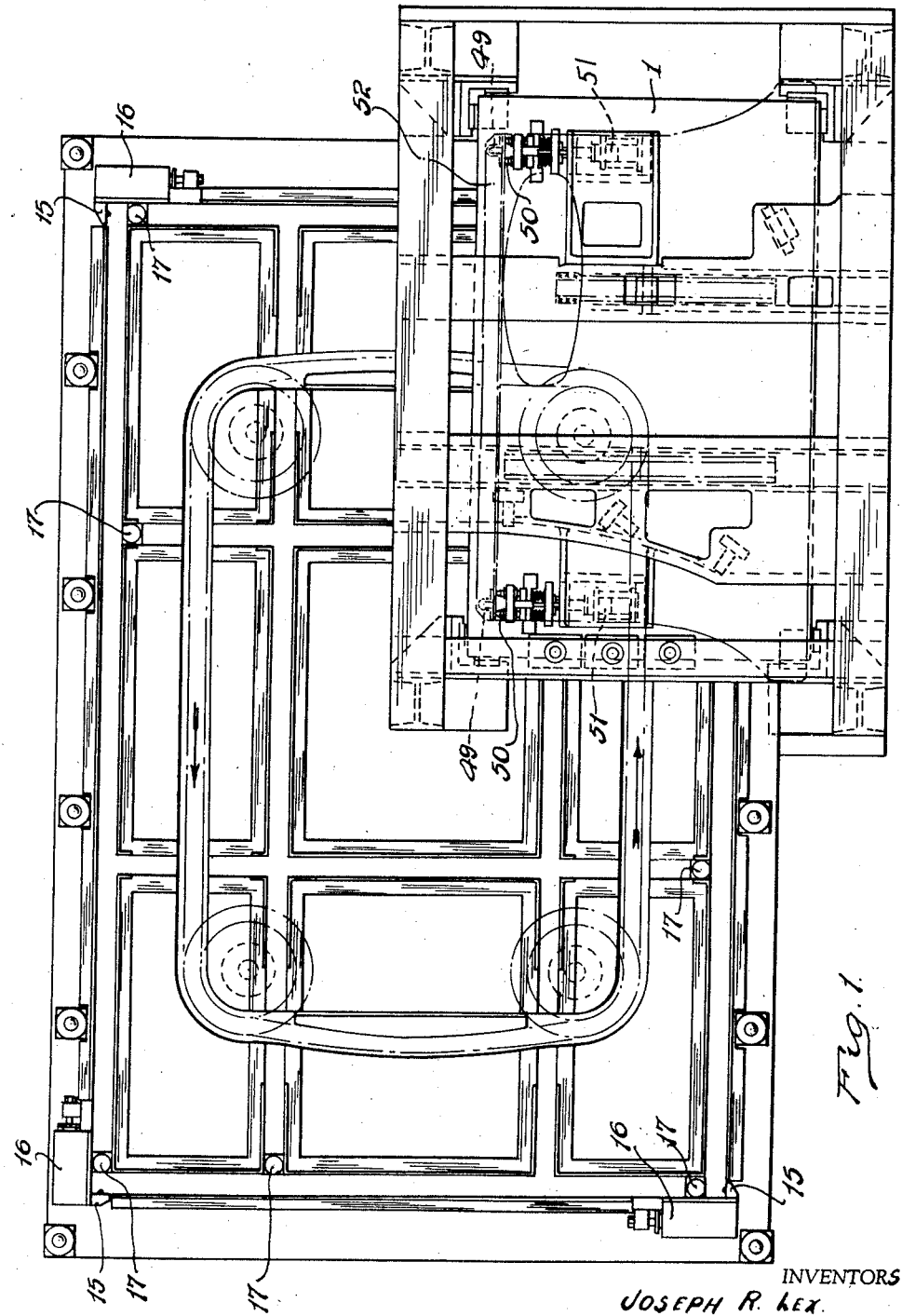
Fig. 1 is a plan view.

A, B, and C are three carriages having, on their bottoms, each a bracket or cross arrangement 2 forming a pair of right angularly intersecting channels 3 and 4. 3 is the transverse channel and 4 the longitudinal channel. A pair of swinging gates 5 are pivoted at the channel intersection. The chain conveyer is provided with a pair of driving pins 6 and 7. The pins are guided in channel track 8. There is another rectangular channel track designated 9. In this travels a pair of lugs 10 of each carriage. Ball bearings 11 support the sliding carriages.

Figure 13:
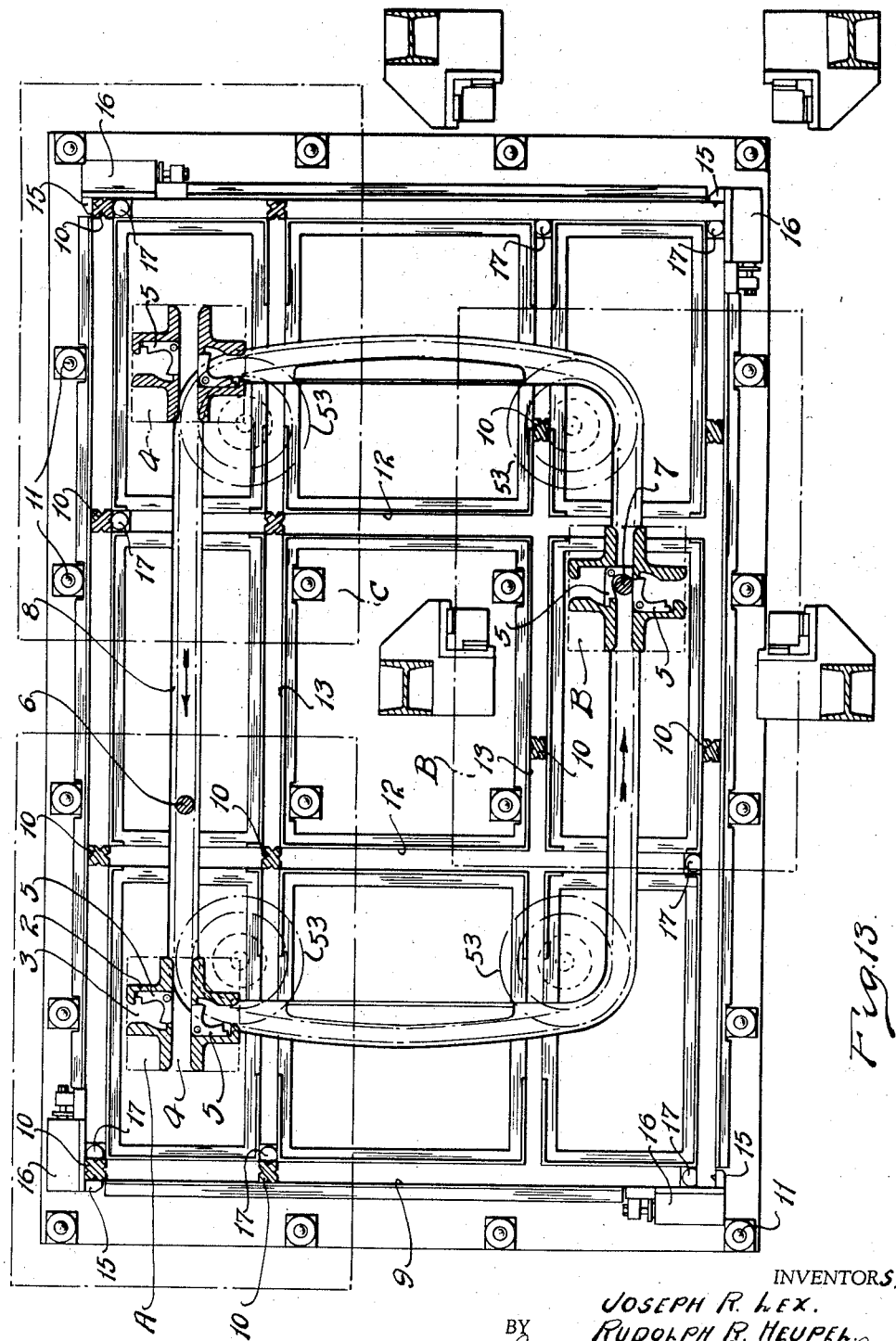
Fig. 13 is a plan view of the conveyer showing, in horizontal cross section, the underside of three carriers.

Referring to Fig. 13, pin 6 is running in inner track 8. It is about to enter the longitudinal channel 4 of carriage A. When sprocket 53 causes the pin to change its travel from the longitudinal to the transverse travel, it picks up carriage A because it butts against the back of gate 5. It will be seen that the pin 7 is already driving carriage B as it butts against the inside of gate 5 which cannot turn counter-clockwise.

Figure 14:
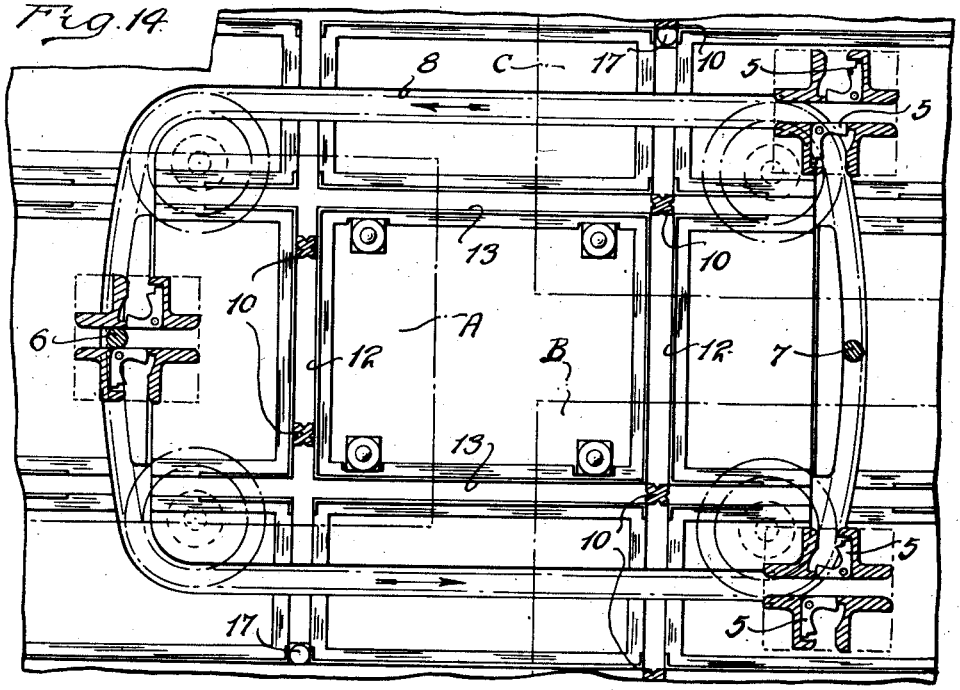
Figs. 14 and 15 are similar views showing the carriages in different positions.

Now, referring to Fig. 14, it will be seen that, when the pin and the carriage B get to the lower right hand corner, the pin starts transversely on the conveyer and the gate rotates and allows the pin to escape. The pin 7 is shown now free from carriage B. When it gets up to the upper right hand corner, it will pick up carriage C because gate 5 will rotate and then, when the pin starts on the longitudinal run of the track, it will jamb against the gate, as shown in Fig. 15, and cause the carriage C to travel longitudinally of the track.

Figure 15:
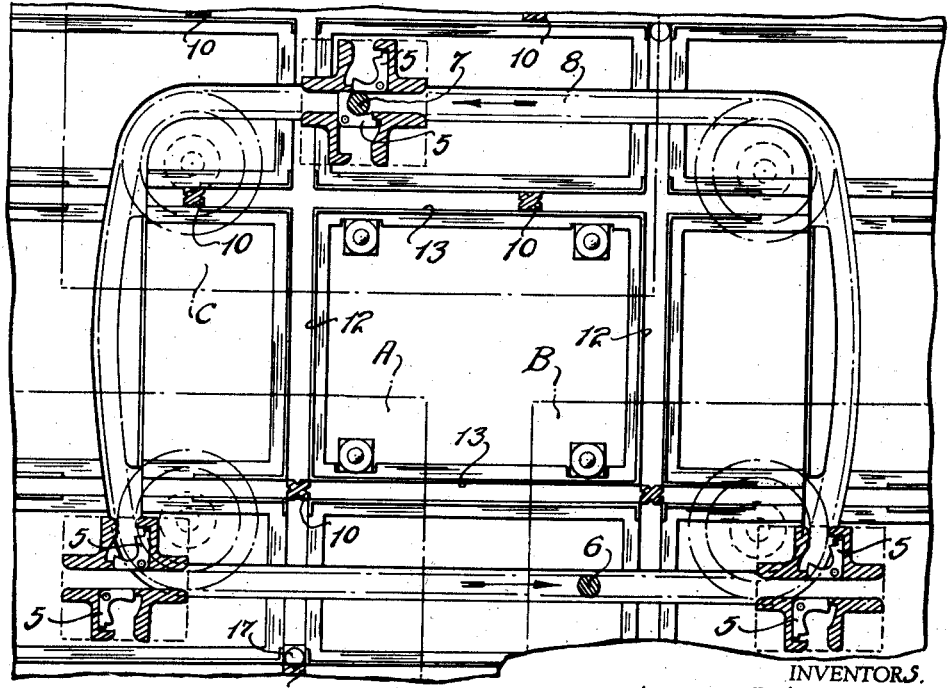

Now, looking at Figs. 13, 14 and 15, it will be seen that there are a pair of inner channel cross tracks 12 and a pair of inner longitudinal tracks 13. Each one of the carriages or tables has four square lugs 10. Consequently, it will be seen, by examining Figs. 13–15 inclusive, that the outer track 9 and the pair of longitudinal and cross tracks 12 and 13 enable these lugs to guide the carriages A, B and C in a true longitudinal and transverse rectilinear movement. These are locking or locating lugs that hold the carriages absolutely still at the corners of the conveyer. This is accomplished by the latching devices shown in Figs. 7 and 8. Each of the lugs 10 has a V-recess 14 on each side. A bumper 15 is connected with a buffer cylinder 16. As the stabilizing lugs arrive at the corner of the track, they pass over beveled latches 17 which snap behind them, as shown in Figs. 7 and 8. These bumpers are used at the corners of the outside track 9.

Figure 2:
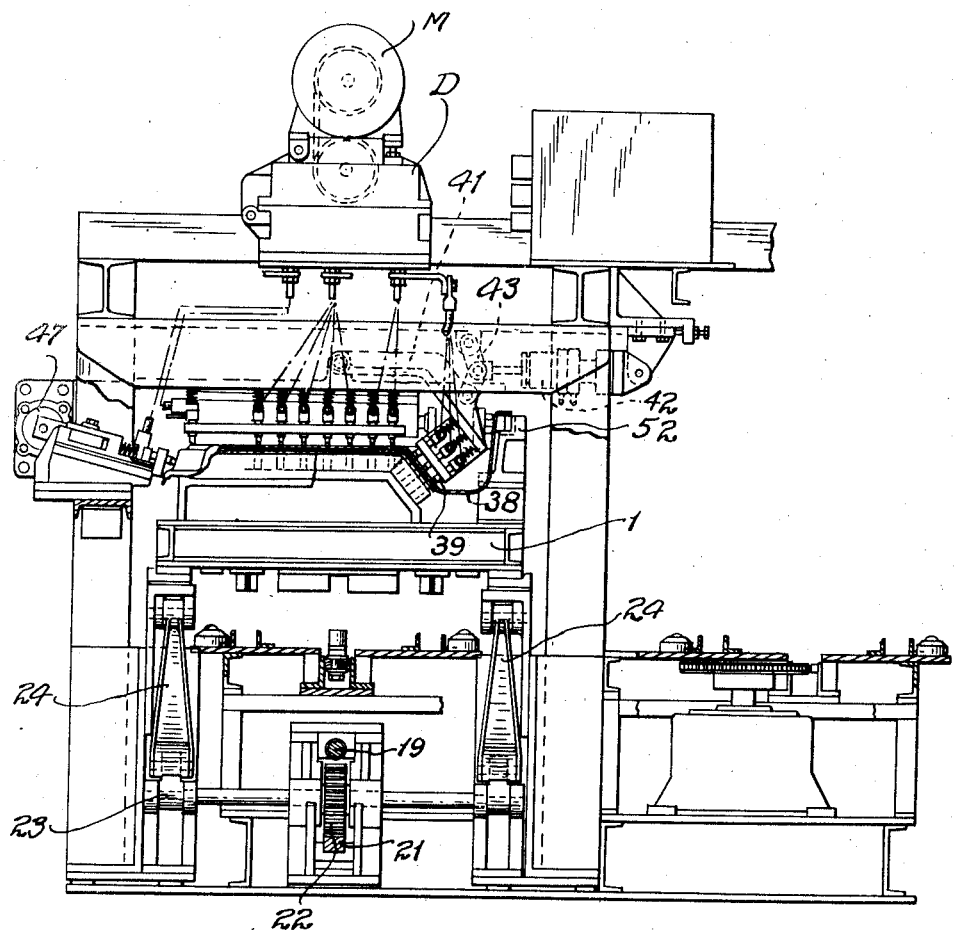
Fig. 2 is an end elevation of the welding apparatus.
Figure 3:
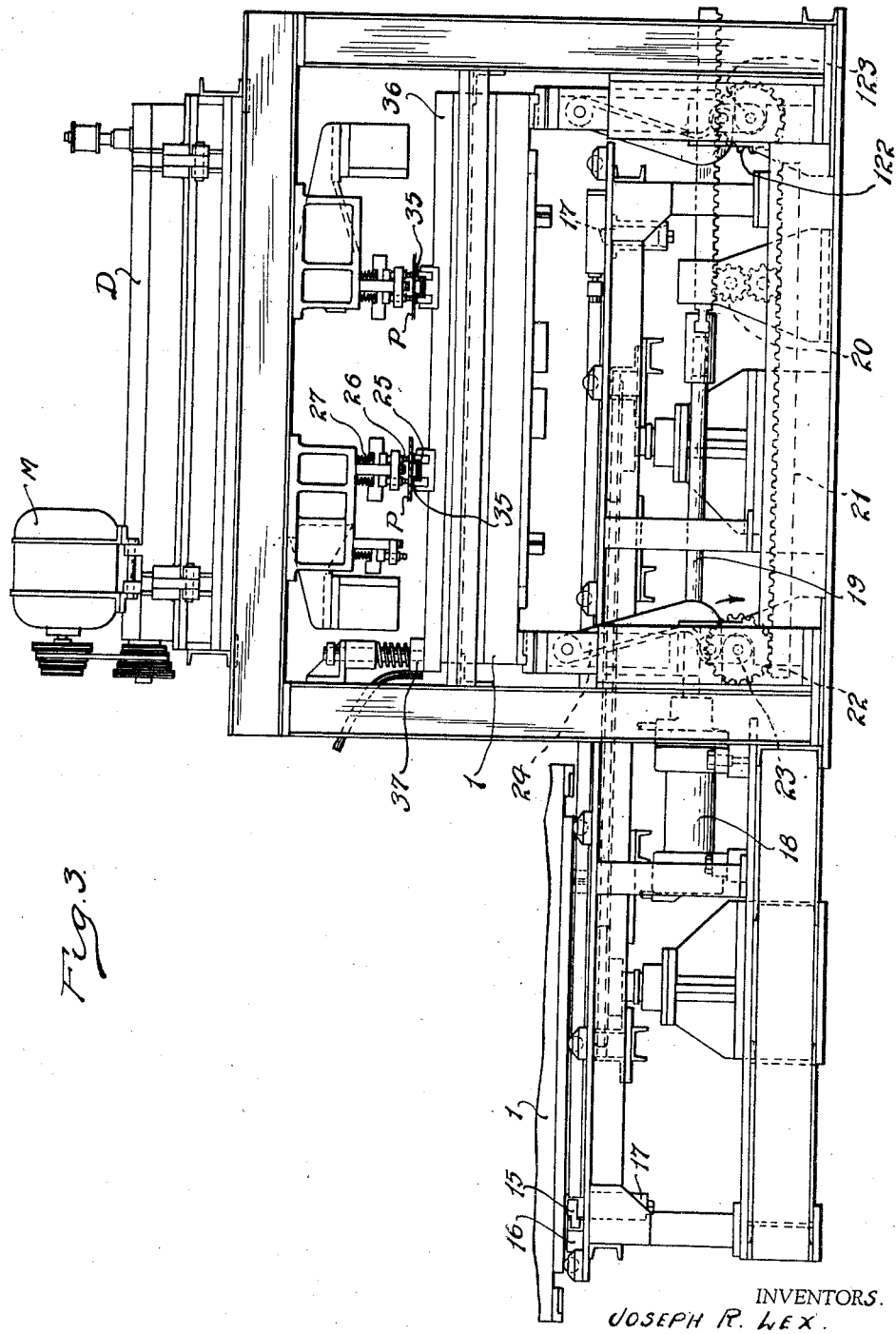
Fig. 3 is a side elevation of the same.
Figure 10:
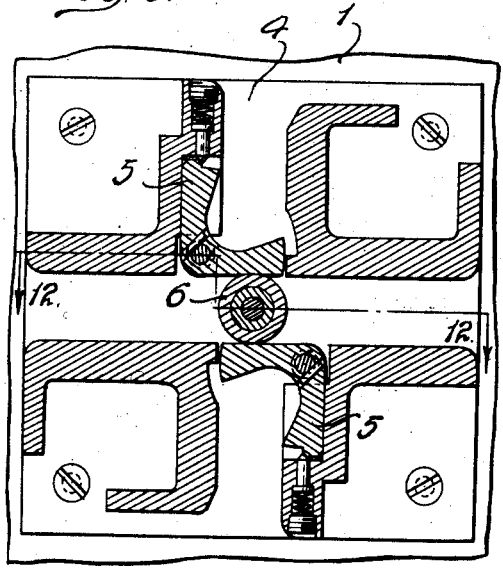
Fig. 10 is a horizontal cross section through the underside of the carriage taken on line 10—10 of Fig. 12 showing the conveyer pin about to pick up the carriage for a transverse travel viewed in the direction of the arrows.
Figure 11:
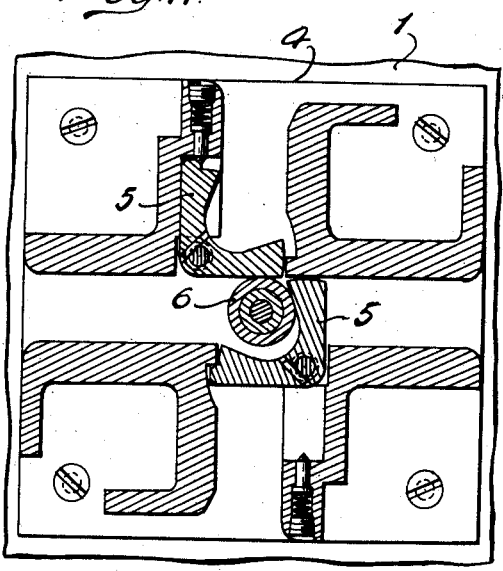
Fig. 11 is a similar view showing the conveyer pin adapted to pick up a carriage for longitudinal travel.
Figure 12:
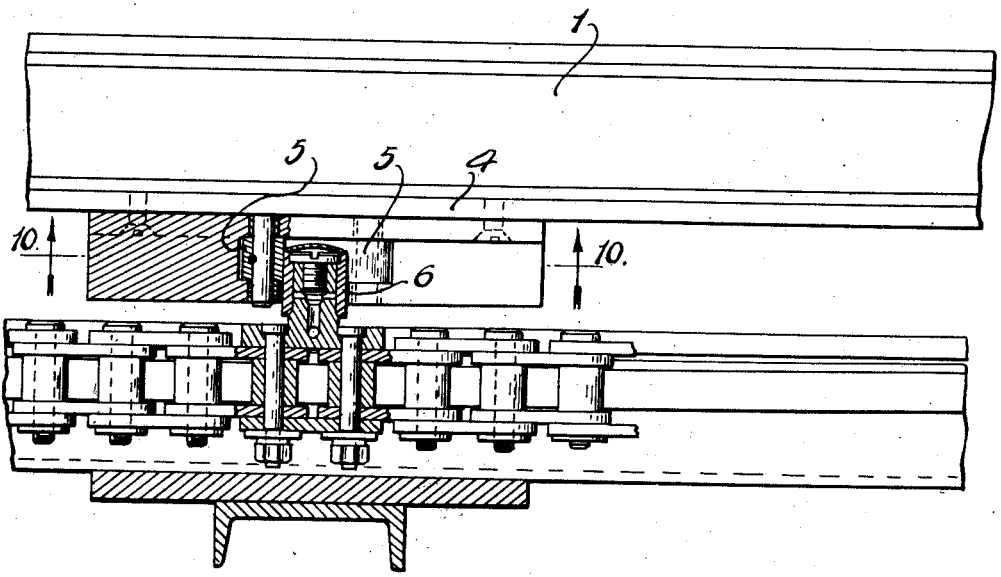
Fig. 12 is a fragmentary view of the conveyer showing the pick-up pin and some of the other parts in vertical section on line 12—12 of Fig. 10.

Figs. 1, 2 and 3 show a work carriage at the welding station for welding items onto the top and front and back of the floor pan, shown in Fig. 16. When the carriage arrives at this station, the hydraulic cylinder 18 is preferably automatically tripped or it could be operated by hand. This reciprocates rack 19, operating gears 20, which operate another rack 21, which operates gear 22, operating crank 23 and rack 19 operates directly on gear 122 to operate crank 123. These cranks operate links 24 to lift the same slightly and thrust the carriage upwardly so the lower electrodes 25 are brought into contact with the channel reinforcing bars 35 that are welded to the floor pan P. The lower electrodes 25 are electrically connected to the copper pad, which is brought into contact with the spring-pressed terminal 37 of the secondary circuit. These lower electrodes are brought into contact with the upper electrodes 26 which are spring-pressed by springs 27.

The floor pan has a depression 38 in which the spare tire rests when the pan is mounted in the body. Electrodes 39, to weld the end of the channel strip 40 to the floor pan in the depression, are mounted on a swinging arm 41 which is forced down on the top of the floor pan which here is at an angle of about 45-degrees. This is accomplished by the hydraulic cylinder 42 and the toggle arms 43. Clips 44 are welded to the underside of the downwardly turned portion of the floor pan by the electrodes 45 which are reciprocated by means of slide 46 operated by hydraulic cylinder 47. Slide 46 has a pin and oblique slot connection 48 with the carriers for the electrodes 45. Channel clips 49 are welded to the back of the pan by electrodes 50 which are forced in contact with the pan by hydraulic cylinders 51. The clip is held in place in the upright copper bracket 52 supported upon the carriage which is part of the secondary. These hydraulic cylinders 42, 47 and 51 can be operated by hand or automatically immediately after the carriage has been raised by oil in hydraulic cylinder 18.

There are four locations on the conveyer where each carriage remains stationary for a given period while the conveyer continues to move. One is the welding station. The other three stations can be used to unload the completed pan, load the reinforcing channels and clips in their proper recess in the jig or secondary pad and then, in the third station, throw the pan over the jig.

One or more distributors D can be operated by the electric motor M for sending the current successively through the electrodes after they have all been brought together. This is an old idea shown, for instance, in the Ledwinka Patent No. 1,269,617. So, the details of this have not been shown. Very rapid welding can be done in this way and the rate of welding can go forward at 400-600 spots a minute. It is only necessary to utilize a few cycles of the current for each welding shot and, with a 60-cycle current, this affords 3600 cycles a minute and, obviously, this can be turned into several hundred welding shots a minute.

We claim:

1. In a continuously moving conveyer having intermittent movement of the work carriage, the combination of a continuously moving conveyer member, a carriage, a station and releasable means operating between the conveyer member and the carriage by the conveyer member changing its direction of movement for leaving the carriage at the work station for a given period for the operation in connection with the work while the conveyer member continues to move.

2. In a continuously moving conveyer having intermittent movement of the work carriage, comprising a continuously moving conveyer member, a work carriage, a plurality of stations and releasing means operating in connection with the said carriage and the conveyer member by the conveyer member changing its direction of movement for successively leaving the carriage at the stations for operations in connection with the work while the conveyer member continues to move.

3. In a continuously moving conveyer having intermittent movement of the work carriage, the combination of a continuously moving conveyer member, a carriage, a station, means operating between the conveyer member and the carriage for leaving the carriage at the station for a given period for operations in connection with the work while the conveyer member continues to move, said means comprising a pin continuously moving on the conveyer member arranged to move the carriage and then release the carriage at the station whenever the conveyer member changes its direction of movement.

4. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move, the said means comprising a gate on the carriage, the continuously moving pin on the conveyer member operating to strike the gate and drive the carriage and then disengage the gate when the station is reached and the conveyer member changes its direction of movement.

5. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move, the said means comprising a pair of intersecting channel ways with a pair of pivoted gates, and a continuously moving pin on the conveyer member arranged to pass into one channel way and pick up the carriage by jambing with a gate and then, when the pin turns its direction of movement, rotating the gate and passing out to the channel way leaving the carriage at the station.

6. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move, and means for holding steady the carriage at the station, comprising a track, a lug traveling in the track and elements for gripping the lug at the station.

7. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move, and means for holding the carriage at the station, comprising a track, a lug traveling in the track and elements for gripping the lug at the station, comprising a latching member and a bumper member.

8. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move and means for holding the carriage at the station, comprising a track, a lug traveling in the track and elements for holding the lug at the station, comprising a latching member and a bumper member, the lug and the bumper having interfitting rib and recess engagement.

9. In a continuously moving conveyer having intermittent movement of the work carriage, the combination of a continuously moving conveyer member, a carriage, a station, means operating between the conveyer member and the carriage for leaving the carriage at the station for a given period for the performance of operations in connection with the work while the conveyer member continues to move, means for holding the work steady when left at a station, comprising a plurality of lugs on the carriage traveling in tracks and elements for gripping one or more of the lugs to hold the carriage stationary when left at the station.

JOSEPH R. LEX.
RUDOLPH R. HEUPEL.